United States Patent [19]

Schmiedel

[11] Patent Number: 4,486,390

[45] Date of Patent: Dec. 4, 1984

[54] REGENERATION OF POLYTHIONATE POISONED ION EXCHANGE RESINS USED IN URANIUM RECOVERY

[75] Inventor: Hans-Peter C. Schmiedel, Wedel/Holstein, Fed. Rep. of Germany

[73] Assignee: Mobil Oil Corporation, New York, N.Y.

[21] Appl. No.: 270,303

[22] Filed: Jun. 4, 1981

[51] Int. Cl.³ .............................................. C01G 43/00
[52] U.S. Cl. ......................................... 423/7; 423/20; 299/4; 210/668; 210/673; 210/682
[58] Field of Search ................. 423/7, 17, 18, 20, 514; 299/4, 5; 210/668, 673, 682

[56] References Cited

U.S. PATENT DOCUMENTS

| | | | |
|---|---|---|---|
| 2,315,534 | 4/1943 | Marasco | 423/514 |
| 2,776,258 | 1/1957 | Gilliland | 210/673 |
| 3,458,440 | 7/1969 | Schmidt | 210/673 |
| 3,692,670 | 9/1972 | Burns et al. | 210/673 |
| 4,214,791 | 7/1980 | Moore | 423/20 |
| 4,296,075 | 10/1981 | Yan | 423/7 |
| 4,298,578 | 11/1981 | Yan et al. | 423/7 |
| 4,312,838 | 1/1982 | Yan | 423/7 |

FOREIGN PATENT DOCUMENTS

| | | | |
|---|---|---|---|
| 1174 | 1/1978 | Japan | 210/673 |
| 910025 | 11/1962 | United Kingdom | 423/7 |
| 1115797 | 5/1968 | United Kingdom | 423/7 |

OTHER PUBLICATIONS

Nugent, *The South African Industrial Chemist*, 10, pp. 282–290, (11–1956).
Annamalai et al., "Operating Experience in the Recovery of Uranium at the Pawnee and Zamzaw Sites", SPE 9507, 1980.

Primary Examiner—Edward A. Miller
Attorney, Agent, or Firm—Alexander J. McKillop; Michael G. Gilman; Charles J. Speciale

[57] ABSTRACT

A process is described for the recovery of uranium from ore wherein the ore is leached, the resulting leachate is passed over an anion exchange resin, and the resin is then eluted with an elution solution containing an anion capable of replacing the uranyl anion captured on the resin, followed by treatment with a sulfite-containing solution so that polythionates captured on the ion exchange resin are reacted to form essentially thiosulfate and trithionate. Preferably, the sulfite solution also contains other anions.

13 Claims, 3 Drawing Figures

Regeneration of Polythionate Poisoned Resins by Sulfite Treatment
Percent $S_4O_6^{--}$ Eluted vs. Volume

- ● Resin Dowex 21K, 16 hours sulfite treatment
- ⊗ Resin Dowex 21K, 16 hours sulfite treatment
- ⊖ Resin Dowex MSA-1, 16 hours sulfite treatment
- ○ Resin Dowex MSA-1, 16 hours sulfite treatment
- ◒ Resin Dowex MSA-1, 2 hours sulfite treatment
- ◓ Resin Dowex MSA-1, 1 hour sulfite treatment Regeneration of Polythionate Poisoned Resins by Sulfite Treatment
Percent $S_4O_6^{--}$ Eluted vs. Volume

- ⊛ Resin Dowex 21K, 16 hours sulfite treatment
- ⊗ Resin Dowex 21K, 16 hours sulfite treatment
- ⊖ Resin Dowex MSA-1, 16 hours sulfite treatment
- ○ Resin Dowex MSA-1, 16 hours sulfite treatment
- ⊖ Resin Dowex MSA-1, 2 hours sulfite treatment
- ⊖ Resin Dowex MSA-1, 1 hour sulfite treatment

Fig. 2

Regeneration of Polythionate Poisoned Resins by Sulfite Treatment
Percentage of Total Recovered Sulfur vs. Volume

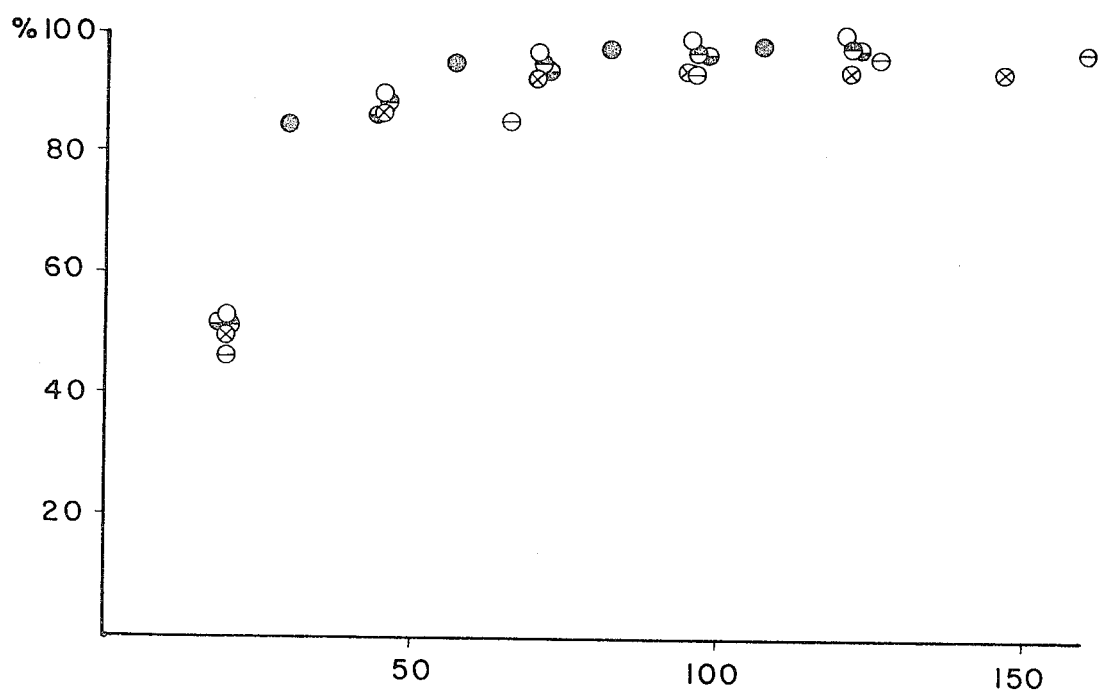

| | |
|---|---|
| ◉ | Resin Dowex 21K, 16 hours sulfite treatment |
| ⊗ | Resin Dowex 21K, 16 hours sulfite treatment |
| ⊖ | Resin Dowex MSA-1, 16 hours sulfite treatment |
| ○ | Resin Dowex MSA-1, 16 hours sulfite treatment |
| ⊖ | Resin Dowex MSA-1, 2 hours sulfite treatment |
| ⊖ | Resin Dowex MSA-1, 1 hour sulfite treatment |

Regeneration of Polythionate Poisoned Resin MSA-1 Loading Curves for Subsequent Loadings With Uranium Solutions

REGENERATION OF POLYTHIONATE POISONED ION EXCHANGE RESINS USED IN URANIUM RECOVERY

FIELD OF THE INVENTION

This invention relates generally to the production of uranium and more particularly to the regeneration of ion exchange resins which are employed in the recovery of uranium from a pregnant leachate formed in an in situ leaching operation. More specifically yet, the present invention relates to the regeneration of such resins which have become poisoned with polythionate.

BACKGROUND OF THE INVENTION

The search for alternate forms of energy has in recent years drawn a great deal of attention to technology associated with the recovery of uranium. In order to produce uranium in a usable form, the uranium-containing minerals must be treated in order to extract and concentrate the uranium values. Depending on considerations such as the quality of ore, the geology and hydrology of the mineral formation, location and distribution of the ore, and environmental impact, the ore may be mined and milled to expose the valuable uranium for contact with a leaching solution, or, if the ore body is not so rich so as to justify expensive mining and scarring of the earth's surface, the uranium may be leached from the ore in situ.

Both methods of uranium recovery require a leaching process by which uranium values are extracted from the gangue, i.e. worthless rock or vein matter in which valuable metals or minerals occur, by means of a leaching fluid or lixiviant. In the case of in situ leaching the leaching fluid is introduced to the ore body through a predetermined pattern of injection wells. The leaching solution, which may be acidic or alkaline depending on the nature of the ore, consists essentially of an oxidant, e.g. $O_2$, $H_2O_2$ or $NaCl_3$, and a leaching agent such as $Na_2CO_3/NaHCO_3$ or $Na_2SO_4/NaHSO_4$. Carbonate leaching is an especially attractive method for several reasons including selectivity of the reaction, purity of the resultant leach liquor, handling ease, etc.

Upon contact with the uranium ore insoluble uranite ($UO_2$) is oxidized by the oxidant in the lixiviant from a tetravalent to a hexavalent leachable state ($UO_3$) according to the following equation, $$UO_2 + H_2O_2 = UO_3 + H_2O \quad (1)$$

which in turn, reacts as in equation (2) below, with the leaching agent to form a soluble uranium complex;

$$UO_3 + Na_2CO_3 + 2NaHCO_3 = Na_4UO_2(CO_3)_3 + H_2O \quad (2)$$

The resulting uranium-enriched solution (pregnant leachate) is then retrieved through a pattern of production wells for separation of the uranium ion complex by means of ion exchange processes.

Ion exchange is, generally speaking, a reversible exchange of ions between a liquid phase and a solid phase which is not accompanied by any substantial change in the basic solid ion-exchange resin structure. Ion-exchange resins consist of three-dimensional covalent networks based on carbon-carbon bonding, to which are attached bound ions. The covalent cross-linkages preserve structural integrity of the materials in service, while the bound ions constitute ion-exchange sites thereby causing the ion-exchange resin to act as an insoluble acid or base which forms an insoluble product with the reactant ion. There are two general types of ion exchange resins —cationic and anionic—depending on the type of ion that is exchanged between the liquid and solid. Thus, an ion exchange resin which removes and releases negatively charged ions, such as uranyl-trisulfate and uranyl-tricarbonate ions, is considered an anion exchange resin. Ion exchange resins are semi-rigid gels generally prepared as spherical beads.

When a solution of uranium-containing anions is passed over an anion exchange resin the reaction proceeds according to the following equations in the case of uranyl-trisulfate and uranyl-tricarbonate, respectively:

$$4R^+X^- + UO_2(CO_3)_3^{-4} \rightleftharpoons R_4[UO_2(CO_3)_3] + 4X^- \quad (3)$$

$$4R^+X^- + UO_2(SO_4)_3^{-4} \rightleftharpoons R_4[UO_2(SO_4)_3] + 4X^- \quad (4)$$

wherein $R^+$ designates the active ion exchange sites on the resin and $X^-$ may be any nucleophilic ion, such as a halide. Based on the law of mass action, the above reaction can be made to proceed in the desired direction by merely increasing the concentration of the ion shown as the free radical.

Therefore, in order to capture the uranium-containing ion on the resin, the concentration of the uranium ions is increased by introducing the leachate to the resin thereby causing the reactions to proceed in the direction of the top arrows. Once the leachate has been passed over the resin, the uranyl complexes are retained on the resin while the rest of the leachate, along with the impurities mixed therewith as a consequence of the leaching operation, may be recovered and treated for recycle without fear of losing the precious uranium.

The uranium ions can then be recovered from the resin by passing a solution containing, for example, chloride ions through the resin so that the reactions are displaced in the direction of the lower arrows. This solution, called an eluant, may contain NaCl and HCl in order to ensure that the appropriate exchange takes place.

The typical anion exchange resin is described as a quarternary ammonium ion-exchange resin. A type I strong base anion exchange resin, such as Dowex MSA-1 and Dowex 2K, is particularly useful because of its effectiveness in capturing the uranyl complex ions as they are contacted with the resin as part of the leachate.

While there are two methods which can be used to contact the uranium-containing solution with the anion-exchange resin, i.e. the batch method and the column method, for commercial purposes the "column method" is preferred. The column method includes passing the leachate through an elongated column which contains the resin, followed by the passage of a second solution through the column which elutes the uranium-containing complex ions from the resin. The latter step is usually referred to as the elution stage of the cycle. Elution solutions necessarily include ions which, as applied to the discussion above, would replace the uranyl complex on the resin site and cause the uranyl complex to go into solution. A typical elution solution may include concentrations of NaCl or $(NH_4)_2CO_3$ thereby providing $Cl^-$ or $CO_3^{-2}$, respectively, as the replacement ions.

The uranium pregnant eluate is then collected in vessels for precipitation preferably by reacting the uranyl complex with hydrogen peroxide in an acid solution to form a hydrated uranium peroxide product, e.g. $UO_4 \cdot XH_2O$.

The resulting precipitate, yellow-cake slurry, is pumped to storage tanks for settling and decanting. After the slurry is settled and the barren solution decanted the slurry is pumped to a vacuum dryer where it is dried to yellow-cake powder.

Although uranium recovery processes such as described above are currently being used, practical problems still exist, including in the use of ion-exchange resins. Specifically, the efficiency of uranium ion capture by the anion exchange resin decreases with use because of the continual buildup of contaminants on the charged ionic resin sites which cannot be removed during normal elution and/or washing of the resin. In the case of both mining and in situ leaching processes wherein the gangue materials are rich in sulfides, such as in pyrites, the ion-exchange resin contaminants include polythionates, $S_nO_6$ (wherein $n \geq 4$). These partially-oxidized sulfur compounds are strong competitors for the exchange sites of the resins and, moreover, are not easily removed from the resin during the elution step. Continual buildup of the undesirable polythionates on the ion exchange resin reduces the number of sites available for the capture of uranyl complexes to such an extent that the expensive exchange resin must be replaced because of excessive uranium "leakage".

In the past, it has been known in the art of anion exchange resins in general to regenerate such resins by contacting them directly with aqueous solutions of an alkali, such as sodium hydroxide, ammonium hydroxide, and sodium carbonate (see U.S. Pat. No. 2,669,713) or with a liquid slurry of solid particles of hydroxide of a metal from the group consisting of calcium, magnesium, barium and strontium (see U.S. Pat. No. 2,507,992). In the case of weak base anion exchange resins, it is known that regeneration may be achieved by contacting the resin with an aqueous lime slurry (see U.S. Pat. No. 3,429,835).

Defouling anion exchange resins of iron and iron oxide is disclosed in U.S. Pat. Nos. 3,078,228 and 3,267,883, respectively. As for iron contaminants, the resin is backwashed with a solution containing hydrosulfites, whereas the iron oxide may be removed by contacting the resin with a chelating agent taken from the class consisting of sodium and potassium polyphosphates and ethylenediamine tetraacetic acid.

Rejuvenation of strong base anion exchange resins contaminated with molybdenum, titanium, zirconium, bismuth, silicon (as silicate), phosphorus (as phosphate), hafnium, tungsten, and, to a lesser extent, iron, chromium, lead, tin, and manganese, is described in U.S. Pat. No. 3,252,920. The cleansing process includes the steps of treating the resin, preferably, as follows:
(1) Acidified nitrate solution
(2) Wash (water)
(3) Alkaline carbonate solution
(4) Moderately strong alkaline solution
(5) Sodium chloride solution
(6) Dilute or moderately strong mineral acid solution (other than phosphoric acid)
(7) Rinse (water)

In U.S. Pat. No. 2,812,312 a method for regenerating ion exchange resins used to remove higher alkyl sulfates from an aqueous solution by use of a strong mineral acid such as sulfuric acid $H_2SO_4$ is disclosed. Other sulfur compounds, including sulfites, have in the past been contemplated as potential reagents for resin regeneration. See E. A. Nugent, "The Chemistry of the Poisons Associated With the Ion-exchange Process," *The South African Industrial Chemist*, Vol. 10, pg. 282-290, November, 1956, wherein sulfites are included among a list of materials in the treatment of resin poisons of the polythionite type. Caustic soda is said to be the compound generally employed for the purpose. In any event, it has never been suggested to use sulfite in a uranium recovery process, nor has there been a recommended dosage which in theory and in practice effectively removes essentially all the polythionates captured on the resin.

Of interest also to the invention disclosed herein, is a paper presented by Velu Annamalai and Frances X. McGarvey at the 55th Annual Fall Technical Conference and Exhibition of the Society of Petroleum Engineers of AIME, held in Dallas, Tex., Sept. 21-24, 1980 (Published article "Operating Experience in the Recovery of Uranium at the Pawnee and Zamzaw Sites," SPE 9507, 1980). The authors state that even though a review of polythionic chemistry indicates that combinations of oxidizing agents and acids might be expected to return the resin to a practical exchange capacity, efforts to date to eliminate polythionates based on such combinations have not been successful. Specifically, a chemical treatment of the resin using 5% caustic, a combination of caustic and salt, and lowering the treatment solution to low pH with diluted hydrochloric acid resulted in some initial improvement in the resin loading capability, but did not produce any substantial improvement in the overall performance of the resin. Further efforts included the use of hydrogen peroxide in attempting to keep the resin clear, but resulted in a physical degradation of the resin due to a general attack on the hydrocarbon chain by the $H_2O_2$. Consequently, the resin exhibited an increase in water retention, swelling, reduction in volume capacity, a general reduction in mechanical strength, and a formation of N-oxide compounds which causes de-quaternization of the strong base groups and a concomitant reduction in uranium holding capacity. The culmination of this work suggests that, even though the study of polythionic chemistry might lead the novice to attempt to rid the exchange resins of polythionate poisoning by use of strong nucleophilic ion species, experience and testing have contraindicated this approach.

Attempts to eliminate polythionates from ion exchange resins have also led, with some success, to treatment of the resin with cyanide, but the use of cyanide creates obvious safety and environmental problems.

It is a primary concern of the present invention to provide a process by which an anion exchange resin used in the recovery of uranium may be kept continuously free of polythionate poisoning.

A further object of this invention is to provide a process wherein the resin does not suffer physical degradation as a result of polythionate cleansing and which presents no safety and/or environmental problems.

SUMMARY OF THE INVENTION

In light of the tortuous background of the art outlined above in regard to regenerating polythionate-poisoned resins, I have unexpectedly found a practical process for the recovery of uranium from uranium-containing ore, which also contains sulfides, by leaching of such ore (thereby forming uranyl complexes and polythionates) followed by passing the leachate through an anion exchange resin to capture the uranyl complexes on the resin (the polythionates formed in the leaching process also being captured on the resin and thus requiring removal in order to preserve the efficiency of the resin) by passing a solution containing a sulfite and preferably a uranyl-replacing ion such as Cl$^-$ through the resin. The sulfite, SO$_3^{-2}$ reacts with the polythionates to form products such as thiosulfate and trithionate according to the following equation:

$$S_nO_6^{-2} + (n-3)SO_3^{-2} \rightarrow S_3O_6^{-2} + (n-3)S_2O_3^{-2} \qquad (5)$$

The reaction products and excess sulfite are easily removed from the resin during the normal elution stages of the cycle. In order to ensure that the polythionates are quickly reacted to form the removable products indicated above, an amount of sulfite greater than what is stoichiometrically necessary according to equation (5) to cause the reaction to proceed in the direction of the arrow should be added to the elution solution.

As a result of the present invention, polythionate poisoning of the ion exchange resin used in uranium recovery may be continuously controlled without the undesirable physical and chemical degradation previously generally associated with reduction of polythionates from such resins. Since no damage occurs to the anion exchange resin in the course of the presently-described regeneration cycle and since there is essentially no interruption in the overall recovery cycle, the entire process becomes more economical because of the reduced requirement for new resin and less down time due to replacement or lengthy regeneration processes.

Further, since the present process requires no special operating conditions, e.g. elevated or depressed temperatures or pressures, and since there are no harmful environmental effects associated therewith, the invention is quite beneficial in a very practical sense by allowing convenient regeneration of uranium-recovery resins right at the field location.

BRIEF DESCRIPTION OF THE DRAWINGS

FIG. 2 demonstrates, using the same measurements as in FIG. 1, the rapidity by which the resin may be cleansed of sulfur when more than the stoichiometric amount of sulfite is contacted with the poisoned resin.

DETAILED DESCRIPTION OF THE INVENTION

Figure 1:
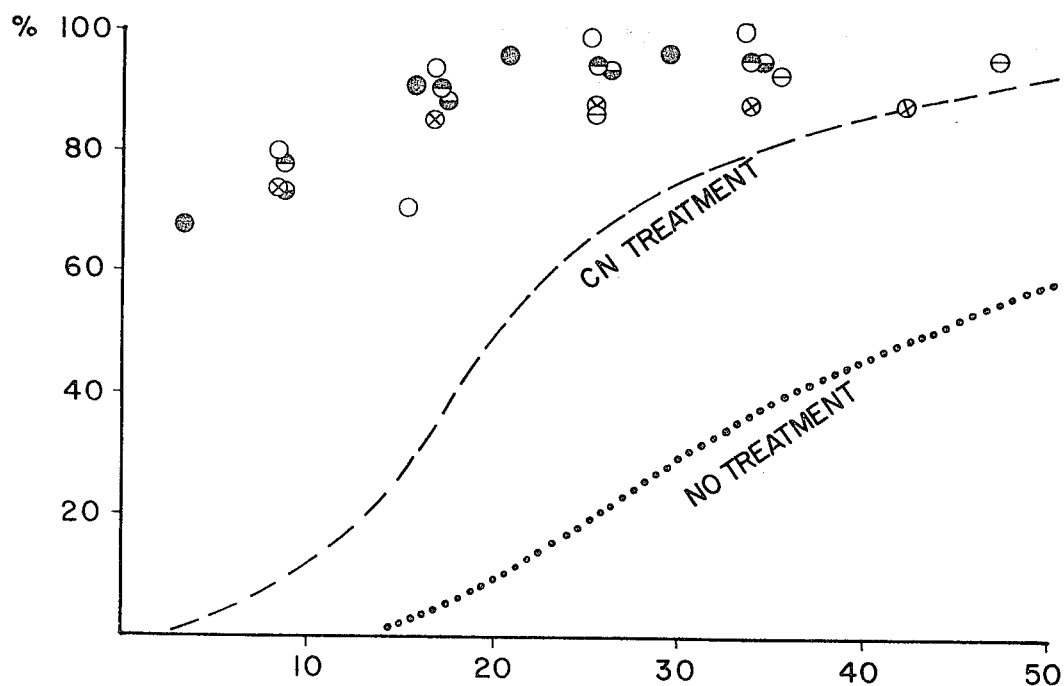
FIG. 1 is a graph comparing the volume of eluant required to remove "captured" polythionates without the benefit of sulfite treatment for removal of polythionates after treating the resin with sulfite. The ordinate shows the percentage of polythionates removed based on a measure of the sulfur in the form of sulfur-containing compounds eluted from a test bed of resin into which a known quantity of polythionates had been introduced. The abscissa indicates the volume of eluant in terms of bed volume which is passed through the resin in order to remove the sulfur contaminants. Eluant volume is measured in bed volumes, that is the volume of the bed of resin used in the recovery process (3 ml of eluant is equal to one bed volume in the present examples).

The regeneration process of the present invention is a modification of previously-considered but rejected chemical theories to provide a means for continually cleaning the anion exchange resin used for uranium recovery of polythionates. Specifically, a solution containing sulfite and which may also contain NaCl in a concentration of about 0.5 to 5 molar is contacted with the polythionate-poisoned resin after a first elution of the resin has taken place so that the polythionates react therewith to form easily-removable products and excess sulfite.

The sulfite is preferably added to the solution as Na$_2$SO$_3$ in a concentration of from about 0.01 M to about 1.0 M Na$_2$SO$_3$ and, in the preferred embodiment, an anion exchanger, such as Cl$^-$, is also present in the solution. The anion exchanger may be added as a 0.5–5 M concentration of NaCl. Residence time of the cleansing solution in contact with the resin should be at least one hour. As will be shown below, additional contact time after the first hour does not significantly effect the desired results.

It has subsequently been found that the resin need not be treated with sulfite as a separate step; instead the sulfite may be added directly to the eluant used to remove the uranium or, alternatively, to the leachate itself. These findings, however, are not part of the present invention. They represent an improvement on this invention by a co-worker and are described herein in an effort to insure full compliance with the patent laws regarding disclosure. The improvement invention is described and claimed in a commonly assigned application Ser. No. 221,554, filed by Tsoung-Yuan Yan on Dec. 31, 1980.

EXAMPLES

The following tests were conducted utilizing anion exchange resins Dowex MSA-1 and Dowex 2K, which are sold commercially by the Dow Chemical Co. These resins are so-called Type I, strong base anion exchange resins.

The first examples are procedures undertaken with pure polythionate solutions in order to determine the effectiveness of the invention on resins loaded purely with polythionates.

Ion exchange columns were filled with 3 ml. of the above-described resins and then loaded with 20 ml. of 0.025 M sodium tetrathionate solution (=0.0005 mol Na$_2$S$_4$O$_6$). The resins were first treated with 20 ml. of a 0.1 M Na$_2$SO$_3$+2 M NaCl solution for different residence times. Next, 25 ml. of 2 M NaCl were used to remove nearly all remaining sulfite from the resin. Finally, a solution of 1.5 M NaCl+0.5 M HCl was used to complete the elution of the thiosulfate and trithionate. Similar regeneration cycles were run using the same NaCl and HCl solution but (1) without any interim treatment and (2) with a cyanide treatment.

Progress of the regeneration was indicated by gravimetric determination of the total sulfur in the eluant followed by a subtraction therefrom of the amount of sulfur introduced as sulfite. The difference was properly regarded as originating from the polythionate. No difference in the amount of sulfur was detected for treatment times in the range of 1 hour to 16 hours, indicating that the reaction is completed within 1 hour.

In accordance with Table I, the values of which are also depicted in FIG. 1, it can be easily seen that the number of bed volumes of eluant required to remove 90% of the polythionates after treatment with sulfite is only 20, while elutions of the resin having had no sulfite treatment removed only as much as 45% of the poisoning polythionates after 40 bed volumes and only 87% after treatment with cyanide after 40 bed volumes.

TABLE I

| Bed Volumes | Polythionate Removal After | | |
|---|---|---|---|
| | No Treatment | Treatment w/Cyanide | Treatment with Sulfite |
| 10 | — | 11% | 78% |
| 20 | 10% | 48% | 90% |
| 30 | 30% | 75% | 93% |
| 40 | 45% | 87% | 96% |

In order to force the reaction (see equation (5) above) in the desired direction only a stoichiometric amount of sulfite is necessary, but an excess of sulfite is advantageous in that it hastens the reaction and the overall process.

In carrying out the above-described tests, four times as much sulfite was used as stoichiometrically required. For the conversion of tetrathionate the sulfur balance under these conditions, i.e.

$$S_4O_6^{-2} + 4SO_3^{-2} = S_3O_6^{-2} + S_2O_3^{-2} + 3SO_3^{-2},$$

would result in 37.5% of the sulfur as trithionate, 25% as thiosulfate and 37.5% remaining as sulfite. The latter two, representing 62.5% of the total sulfur, are easily eluted. In fact, the 20 ml of 0.1 M Na$_2$SO$_3$+2 M NaCl solution used, in the average removes from the column 50% of the total sulfur, mostly as $SO_3^{-2}$ and $S_2O_3^{-2}$. (See FIG. 2.) The content of $S_2O_3^{-2}$ and $SO_3^{-2}$ in the eluate rapidly decreases thereafter.

Further tests were performed to determine the ultimate impact of the invention on actual uranium recovery. Accordingly, solutions containing both uranium and polythionates were passed through the resin Dowex MSA-1, followed by passage of a pure uranium-containing solution.

Specifically, a column filled with 3 ml of Dowex MSA-1 was loaded with a solution containing 200 ppm U$_3$O$_8$, 200 ppm $S_4O_6^{-2}$, 15 g Na$_2$SO$_4$/liter, 2 g NaHCO$_3$/liter, and 3.286 g NaCl/liter for four times (with intermediate elutions with 1 M HCl) during which the amount of uranium was measured. The uranium readings in parts per million vs. bed volumes for these first four runs are indicated by lines 1, 2, 3 and 4 in FIG. 3.

Following a treatment with sulfite three more cycles were carried out with solutions of the same composition except that no polythionate was present. Similar measurements were made and recorded at lines 5, 6 and 7, in FIG. 3.

Figure 3:
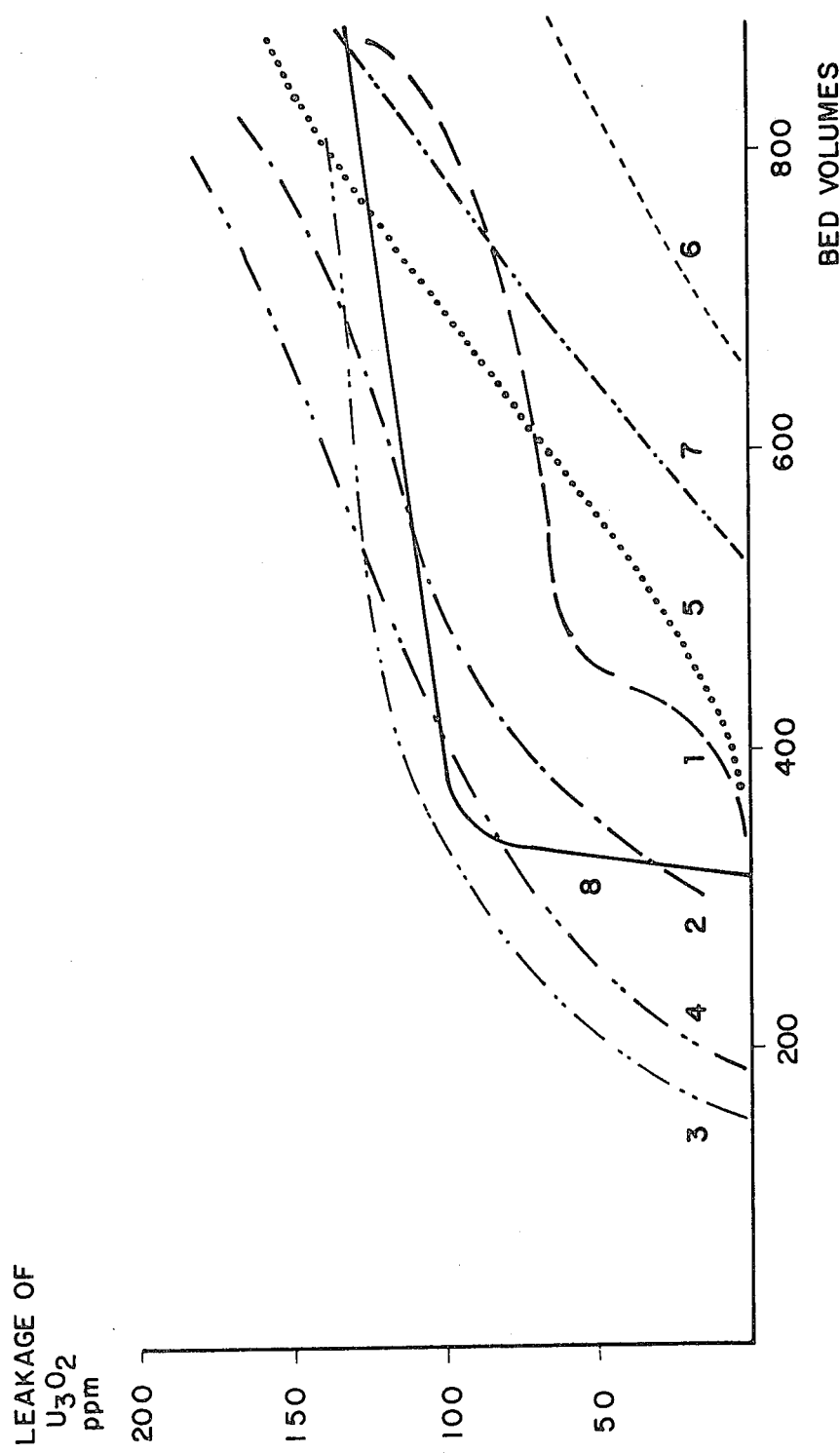
FIG. 3 is a graph depicting the amount of uranium leakage which results from polythionate poisoning with and without sulfite treatment. The ordinate is a measure of the amount of uranium present in parts per million (ppm), while the abscissa indicates the volume (again in "bed volumes" wherein 3 ml=1 bed volume) of uranium-containing solution being passed through the resin.

These cycles enabled a check of the regeneration of the resin and the test was concluded with a final loading with the same 200 ppm $S_4O_6^{-2}$ containing solution that had been used in the first four cycles—see line 8 in FIG. 3.

The effectiveness of the sulfite method for regeneration of polythionate poisoned resin is demonstrated by the results shown in FIG. 3, i.e. an increase in the leakage of uranium and a decrease in the loading capacity for uranium to about 60% of the initial value. After the fourth cycle, the resin was regenerated with sulfite and eluted with 1.5 M NaCl+0.5 M HCl. Cycles 5, 6 and 7 were then run with uranium solutions free of polythionate. The decrease in leakage of uranium and the gain in the loading capacity for uranium are evident. The leakage behavior of fresh Dowex MSA-1 resin falls in the region between runs 6 and 7. In the final cycle 8, again a uranium solution was used that contained 200 ppm $S_4O_6^{-2}$ as a poison. A sharp increase in uranium leakage and decrease in loading capacity was observed.

From these examples it should be clear that sulfite is an unusually effective defouling agent for the removal of polythionates. Furthermore, no derogatory effect on the resin has been detected in the use of sulfite.

The foregoing description of my invention has been directed to particular details in accordance with the requirements of the Patent Act and for purposes of explanation and illustration. It will be apparent, however, to those skilled in this art that many modifications and changes may be made without departing from the scope and spirit of the invention. It is further apparent that persons of ordinary skill in this art will, on the basis of this disclosure, be able to practice the invention within a broad range of process conditions. It is my intention in the following claims to cover all such equivalent modifications and variations as fall within the true scope and spirit of my invention.

What is claimed is:

1. A process for the recovery of uranium from uranium-containing ore which also contains sulfides, comprising:
   (a) leaching said ore to form uranyl complexes and polythionates;
   (b) passing the leachate through an anion exchange resin to capture said uranyl complexes and said polythionates on said resin;
   (c) eluting said resin with a solution containing an anion capable of replacing said uranyl complex to recover said uranyl complexes from the resin;
   (d) repeating steps (a) to (c) until the resin's loading capacity is substantially reduced to polythionate poisoning;
   (e) treating the resin with the eluting solution of step (c) additionally containing a sufficient concentration of sulfite to convert substantially all the polythionates on the resin to thiosulfates, trithionates or lower thionates, or any mixtures thereof; and
   (f) treating the resin with the eluting solution of step (c) wherein said solution contains at least 0.5 M hydrochloric acid to remove from the resin the thiosulfates, trithionates or lower thionates, or any mixtures thereof formed in step (e).

2. The process of claim 1 wherein the solution of step (e) contains from about 0.01 M to about 1.0 M Na$_2$SO$_3$.

3. The process of claim 1 wherein the eluting solution of step (c) contains from about 0.5 M to about 5 M NaCl.

4. The process of claim 1 wherein the resin is treated in accordance with step (e) for at least one hour.

5. The process of claim 1 wherein the sulfite concentration is in substantial excess of stoichiometrically required amounts.

6. In a process for the recovery of uranium from uranium-containing ore which also contains sulfides comprising leaching said ore to form uranyl complexes and polythionates, passing the leachate through an anion exchange resin to capture said uranyl complexes and said polythionate on said resin, eluting said resin with a solution containing an anion capable of replacing said uranyl complexes, wherein the polythionates poison said resin, the improvement comprising:
  (a) depoisoning said resin by treating the resin with the eluting solution additionally containing a sufficient concentration of sulfite to convert substantially all the polythionates on the resin to thiosulfates, trithionates or lower thionates, or any mixtures thereof, and
  (b) treating the resin with a chloride solution wherein the chloride concentration is at least 2 M and wherein at least 0.5 M of the chloride is obtained by addition of hydrochloric acid.

7. The process of claim 6 wherein the eluting solution of step (a) contains from about 0.01 M to about 1.0 M $Na_2SO_3$.

8. The process of claim 6 wherein the eluting solution of step (a) contains from about 0.5 M to about 5 M NaCl.

9. The process of claim 6 wherein the resin is treated in accordance with step (a) for at least one hour.

10. The process of claim 6 wherein the sulfite concentration is in substantial excess of stoichiometrically required amounts.

11. A process for the recovery of uranium from uranium-containing ore which also contains sulfides, comprising:
  (a) leaching said ore to form uranyl complexes and polythionates;
  (b) passing the leachate through an anion exchange resin to capture said uranyl complexes and said polythionates on said resin;
  (c) eluting said resin with a solution containing an anion capable of replacing said uranyl complex to recover said uranyl complexes from the resin;
  (d) repeating steps (a) to (c) until the resin loading capacity is substantially reduced due to polythionate poisoning;
  (e) treating the resin with a solution of about 0.1 M sulfite and about 2 M chloride for at least one hour to convert substantially all of the polythionates on the resin to thiosulfates, trithionates or lower thionates, or any mixtures thereof; and
  (f) treating the resin with a solution of about 1.5 M chloride and about 0.5 M hydrochloric acid to remove from the resin the thiosulfates, trithionates or lower thionates, or any mixtures thereof formed in step (e).

12. The process of claim 11, comprising, after step (e) and before step (f), the additional step of treating the resin with a solution of about 2 M chloride.

13. The process of claim 11 wherein the sulfite concentration is in substantial excess of stoichiometrically required amounts.

* * * * *